United States Patent [19]

Heynau

[11] Patent Number: 5,113,065
[45] Date of Patent: May 12, 1992

[54] HETERODYNE CIRCULAR PHOTODETECTOR ARRAY IN A TRACKING SYSTEM

[75] Inventor: Hans A. Heynau, North Palm Beach, Fla.

[73] Assignee: United Technologies Corporation, Hartford, Conn.

[21] Appl. No.: 580,068

[22] Filed: Sep. 10, 1990

[51] Int. Cl.⁵ .................................................. G01J 1/20
[52] U.S. Cl. .............................. 250/203.2; 250/208.6
[58] Field of Search .................. 250/203.2, 208.6, 561; 356/1, 4, 141, 152

[56] References Cited

U.S. PATENT DOCUMENTS

| | | | |
|---|---|---|---|
| 4,123,651 | 10/1978 | Mongeon | 250/203.2 |
| 4,713,533 | 12/1987 | Bremer et al. | 250/203.2 |
| 4,790,651 | 12/1988 | Brown et al. | 250/203.2 |
| 4,816,665 | 3/1989 | Hsu | 250/208.6 |
| 4,843,603 | 6/1989 | Prikryl | 250/203.2 |

*Primary Examiner*—David C. Nelms
*Assistant Examiner*—K. Shami
*Attorney, Agent, or Firm*—Philmore H. Colburn, II

[57] ABSTRACT

A heterodyne photodetector array; whereby a source beam 32 is reflected off of an object 34 forming a return beam 36 is directed onto an array 48. The array has a centered photodetector cell 52 (FIG. 2) which is surrounded by a plurality of outer photodetector cells 50. The outer cells provide one or more signals for angular tracking of the object, while the center cell provides a signal which may be employed in vibration sensing or other signature measurement applications.

19 Claims, 1 Drawing Sheet

HETERODYNE CIRCULAR PHOTODETECTOR ARRAY IN A TRACKING SYSTEM

DESCRIPTION

1. Technical Field

This invention relates to photodetector arrays and more particularly to heterodyne photodetector arrays.

2. Background Art

The use of quadrant photodetector arrays for tracking applications is well known in the art Generally non-heterodyne type laser detection, or so called direct detection, is employed to track an object A laser beam is impinged on the object to produce a return beam, which itself is a reflection of the laser beam. The return beam is focused, through an optical configuration, onto the quadrant photodetector. The detector types commonly employed are a square quadrant array and a circular quadrant array. The quadrant array comprises four photodetectors, one in each quadrant. Each detector converts photon energy from the return beam into electrical energy.

In a closed-loop laser tracking system, the return beam forms a spot on the quadrant array. When the spot is centered in the array the output of each photodetector is equal, which is the desired position when tracking. This position is referred to as the boresight. The output of each photodetector varies with the intensity of the laser light impinged thereon Thus, when the spot shifts from center, the photodetectors on which the spot is now focused will have a higher output than the other photodetectors in the array. This shift requires a correction in the direction of the system until the spot is returned to the center.

The return beam carries information concerning the object tracked which may be processed and employed for vibration sensing or other signature requirements. When the array output is used for other than angular tracking the signal-to-noise ratio (S/N) becomes an increasingly critical factor.

The return beam has a noise level associated with it caused by the reflection and atmospheric disturbances. The noise level is increased in the conversion of the photon energy into the electrical signal in the photodetector. Thus, when the spot is located in the center, each photodetector adds noise to the electrical signal through the conversion. When these four outputs are summed, the added noise from the four photodetectors is also summed, thus resulting in a lower S/N. The S/N for the array is approximately 100% of the signal divided by four units of noise, one unit for each photodetector cell, which results in a S/N of 0.25. Even if only one output from one of the cells is used (i.e. not summed outputs) the S/N would be the same. The cell has approximately 25% of the signal focused on the cell, assuming the spot is in the center, which is divided by one unit of noise, resulting in a S/N of 0.25. However, less information is available for applications other than tracking when only 25% of the signal is utilized.

The problem with the summed noise occurs in the photodetectors and, therefore, it exists with both non-heterodyne and heterodyne detection. Although heterodyne detection is generally used for greater detector sensitivity, the problem of signal noise is greater than with non-heterodyne detection This is due to the noise added to the beam from a reference laser when it is heterodyned. Even though the reference beam is generally chosen such that the shot noise of the reference beam will dominate other noises (i.e. shot noise limited), there is more noise in the beam with heterodyne detection than with non-heterodyne detection.

Simultaneous tracking and vibration or signature measurements is accomplished with heterodyne or non-heterodyne detection, by employing two separate detectors. The quadrant photodetector array is employed for angular tracking and a single photodetector is employed for vibration sensing or other signature measurements. The return beam may be combined with a beam from a reference laser for utilizing heterodyne detection. This produces a combined beam which is divided by a beam splitter (assuming an 80/20 split), so that 20% of the beam is focused through an optical configuration onto the quadrant array and 80% of the beam is focused through another optical configuration onto the single photodetector. Tracking is performed by the quadrant array, in the same manner previously described.

The S/N for the electrical output from the single photodetector is 80% of the total signal divided by one unit of noise, one unit of noise for the single photodetector. This results in an S/N is 0.8, which is an improvement over the S/N of 0.25 of the summed outputs of the quadrant array or of the output from a single cell of the quadrant array (described hereinbefore). Although not all of the signal is being employed for vibration sensing or signature measurements, only a small amount of the signal is sacrificed to provide for angular tracking. Also, more of the information from the signal is available in the electrical output from the single photodetector than the single cell of the quadrant array.

However, due to losses incurred by splitting the combined beam, less than 80% of the signal is actually impinged on the single photodetector 12. Thus, the actual S/N for the electrical output of the single photodetector is less than 0.8. Also, the optical alignments required to split the combined beam and focus the two separate beams on the two separate detectors results in optical alignment errors, further decreasing the S/N.

DISCLOSURE OF THE INVENTION

Objects of the present invention include provision of a heterodyne photodetector array, which detects a return beam from a laser for angular tracking, and which increases the signal-to-noise ratio of a photodetector electrical output so as to be employable for vibration sensing or other signature measurements.

According to the present invention, a heterodyne detector array is formed by a plurality of outer photodetector cells which detect a displacement of a spot produced by a return beam focused on the array, to provide an electrical tracking output indicative of the spot displacement, the outer cells surrounding a centered boresight photodetector cell, the boresight cell being impinged upon by a significant portion of the spot to produce an electrical output with a relatively high signal-to-noise ratio.

The present invention increases signal-to-noise ratio of an output adapted for employment in vibration sensing or other signature measurements, in exchange for a minor degradation, as compared to the prior art detector, in angular tracking capabilities The invention is capable of utilizing heterodyne detection with a single photodetector array, and at the same time increasing the S/N of the electrical output. The increase in the S/N allows for utilization of the output in vibration sensing and signature measurement applications. The use of a single photodetector array eliminates the need for a beam splitter and a separate detector, in order to simultaneously track and satisfy other measurement applications.

The foregoing and other objects, features and advantages of the present invention will become more apparent in light of the following detailed description of an embodiment of the invention, as shown in the accompanying drawing.

BEST MODE FOR CARRYING OUT THE INVENTION

Figures 1, 2:
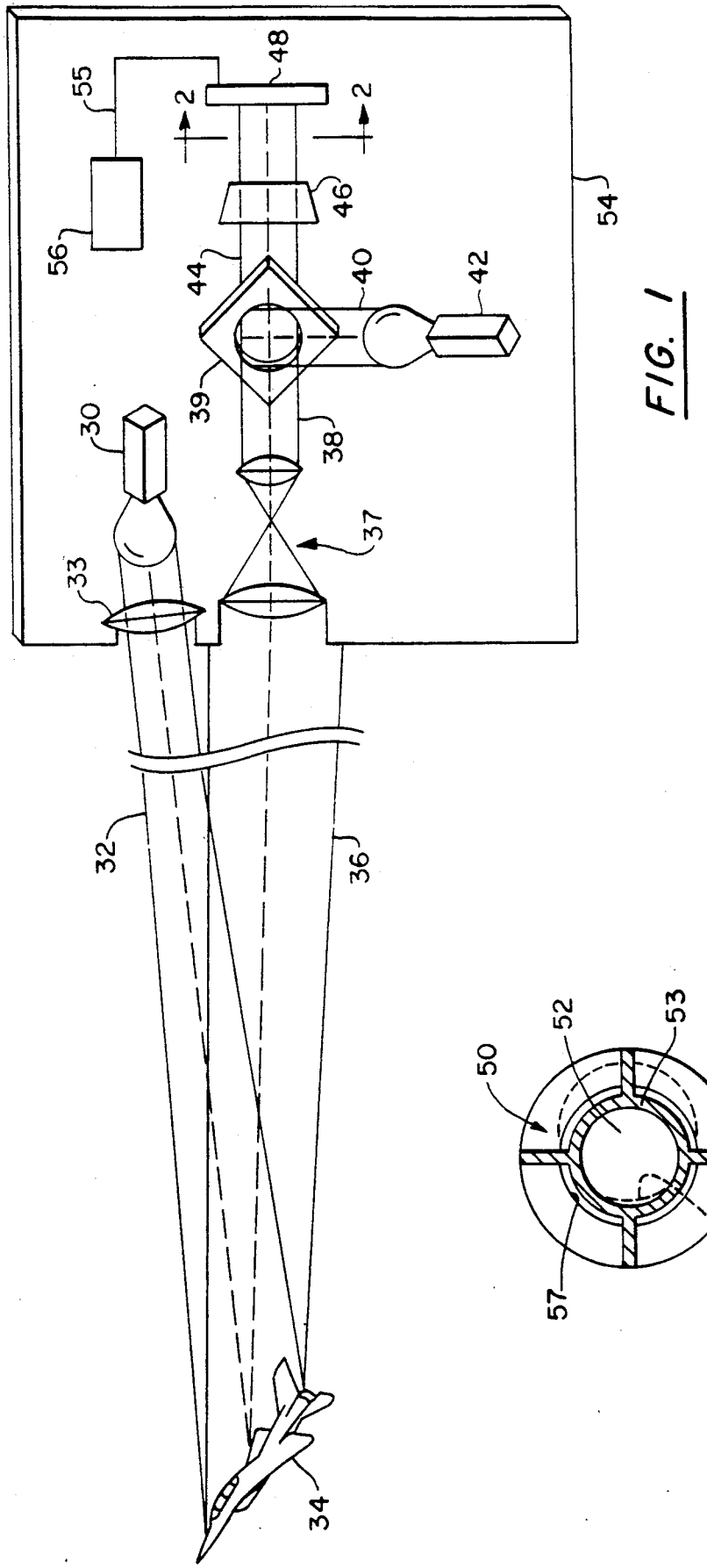
FIG. 1 is a simplified schematic diagram of an embodiment of a heterodyne photodetector array according to the present invention.
FIG. 2 is a front view, in the direction of the line 2—2 of FIG. 1, of the heterodyne photodetector array with a laser spot in accordance with the present invention.

Referring now to FIG. 1, an embodiment of the present invention comprises a source laser 30 which produces a source beam 32. The source laser is directed through a collimating lens 33 at an object 34 to be tracked and/or sensed, thereby impinging the source beam on the object. The source beam is reflected from the object producing a return beam 36 which impinges on a reduction telescope 37, to provide a reduced beam 38. The reduced beam 38 may be combined in a beam combiner 39, with another beam 40 from a reference laser 42 for heterodyne detection of the return beam. The combined beam 44 is imaged on a lens 46 which focuses the beam on a photodetector array 48, comprising four outer detector cells 50 (FIG. 2) and a center or boresight detector cell 52. A small mask border 53 assures that each cell is isolated from the other cells. Heterodyne detection may be employed to increase the detector sensitivity, thereby increasing the distance from which the reflected source beam (i.e. the return beam) can be detected. The source laser, the collimating lens, the reduction telescope, the beam combiner the reference laser, the lens and the detector are disposed on a directional platform 54.

Each photodetector cell converts photon energy into an electrical signal, which varies with the level of photon energy impinged on the cell. The outer detector cell outputs, on a line 55, are connected to a directional feedback control 56 ("DFC"). The DFC output signal provides means for directional correction of the platform 54 during angular tracking.

The return beam forms a spot, the circumference of which is illustrated by a circle 57 on the array. The spot should be slightly larger than the boresight cell 52, so that when the spot is centered, a portion of the spot is equally impinged on each of the outer cells 50. The outer cells provide for the angular tracking capabilities of the array. A shifted spot, shown by a dashed line 58, results in a change in the electrical outputs of the various cells. This indicates that the directional relationship between the object and the source laser has changed requiring a correction in the direction of the platform. The platform direction is corrected in accordance with the DFC output signal, so that the spot from the return beam is again focused in the center and the electrical outputs of the four outer cells are equalized. Tracking accuracy is degraded as compared to the tracking accuracy of the prior art quadrant photodetector array, due to the lower S/N of the outer cells which is indicative of the reduced area of these cells covered by the spot. However, the tracking accuracy sacrificed allows for vibration sensing and signature measurement capabilities.

The information contained in the return beam may be employed for vibration sensing or other signature measurements. This information is retained when the beam is converted into the electrical signal. The S/N on the signal should be maximized in order to assure accurate vibration and signature measurements. The entire boresight cell is covered by the spot when it is focused in the center. The signal impinged on the outer cells should be minimized to an extent commensurate with desired tracking accuracy. The electrical signal from the boresight photodetector cell may be utilized for further sensing or other measurements.

Assume, for illustration purposes, that 80% of the spot in focused on the boresight cell 52 and 5% is focused in each outer cell 50 when the spot is in the center. Further assume that the loss from the mask border is negligible. However, if the loss is to be accounted for, the result is a reduced percentage on the signal impinged on the outer cells 50 and the 80% of the signal impinged on the boresight cell 52 is to be maintained. Therefore, the S/N for the electrical output from the boresight cell is 80% of the total signal divided by one unit of noise, one unit of noise for each photodetector cell. Thus, the S/N is 0.8, which is significantly greater than the S/N of 0.25 with the summed outputs of the prior art quadrant photodetector array. Also, considerably more information is available in the electrical output from the boresight cell than a single cell of the prior art quadrant array. Further, the boresight S/N is higher than the S/N of the prior art system utilizing a single cell from the quadrant photodetector array. Although, not all of the signal is employed for vibration sensing or signature measurements, only a small amount of the signal is sacrificed to provide for angular tracking.

Although the S/N is only a slight improvement over the two detector system (described in the background art), the present invention achieves these results with a single detector system. Further, the single detector significantly reduces the complexity and optical alignment tolerances of a system, as compared to a prior art system.

The foregoing description is merely exemplary and it should be understood that the number of outer cells 50 may be increased or decreased without departing from the scope of the present invention. Although the heterodyne photodetector array is illustrated as a circular array other overall shapes may be employed, such as a square array.

It suffice for the broadest scope of the present invention that a center photodetector cell 52 is surrounded by a plurality of photodetector cells 50 forming a detector array. Similarly, although the invention has been shown and described with respect to the exemplary embodiments thereof, it should be understood by those skilled in the art that the foregoing and various other changes, omissions and additions in the form of detail thereof may be made therein and thereto, without departing from the spirit and scope of the invention.

I claim:

1. Apparatus for angular tracking of an object, comprising:
    source means, for producing a source beam which is impinged on the object, said source beam is reflected off of the object in the form a return beam;

detector means, having a center photodetector cell disposed in the center of an array, said array having a plurality of outer photodetector cells surrounding said center cell, said center cell and said outer cells comprising means for converting photon energy from said return beam into one or more electrical signals indicative of a positional shift of said return beam on said array; and direct means, responsive to said electrical signals, for maintaining a predetermined directional relationship between said source means and the object.

2. Apparatus according to claim 1, further comprising an optical means, for directing said return beam onto said array.

3. Apparatus according to claim 1, wherein said outer photodetector cells comprise four identical photodetector cells, each of said outer photodetector cells being adjacent to two other of said outer photodetector cells, one of said outer cells disposed in each quadrant.

4. Apparatus according to claim 1, wherein said array comprises each of said outer cells being separated from each other of said outer cells by a mask, and each of said outer cells is separated from said center cell by said mask.

5. Apparatus for angular tracking of an object, comprising:

source means, for producing a source beam which is impinged on the object, said source beam is reflected off of the object in the form a return beam;
reference means, for proving a reference beam;
combine means, for combining said return beam and said reference beam to produce a combined beam;
detector means, having a center photodetector cell disposed in the center of an array, said array having a plurality of outer photodetector cells surrounding said center cell, said center cell and said outer cells comprising means for converting photon energy from said combined beam into one or more electrical signals indicative of a positional shift of said combined beam on said array; and
direct means, responsive to said electrical signals, for maintaining a predetermined directional relationship between said source means and the object.

6. Apparatus according to claim 5, further comprising an optical means, for directing said combined beam onto said array.

7. Apparatus according to claim 5, wherein said outer photodetector cells comprise four identical photodetector cells, each of said outer photodetector cells being adjacent to two other of said outer photodetector cells, one of said outer cells disposed in each quadrant.

8. Apparatus according to claim 5, wherein said array comprises each of said outer cells being separated from each other of said outer cells by a mask, and each of said outer cells is separated from said center cell by said mask.

9. Apparatus for simultaneous angular tracking and signature sensing of an object, comprising:

source means, for producing a source beam which is impinged on the object, said source beam is reflected off of the object in the form a return beam;
sensor means, having a center photodetector cell, said center cell being substantially covered by said return beam, said center cell comprising means for converting photon energy from said return beam into an electrical signature signal indicative of an optical signature contained in said return beam;
tracking means, having a plurality of outer photodetector cells surrounding said center cell forming an array, said outer cells having a portion thereof being impinged upon by said return beam, said outer cells comprising means for converting photon energy from said combined beam into one or more electrical tracking signals indicative of a positional shift of said return beam on said array; and
direct means, responsive to said electrical tracking signals, for maintaining a predetermined directional relationship between said source means and the object.

10. Apparatus according to claim 9, further comprising an optical means, for directing said return beam onto said array.

11. Apparatus according to claim 9, wherein said outer photodetector cells comprise four identical photodetector cells, each of said outer photodetector cells being adjacent to two other of said outer photodetector cells, one of said outer cells disposed in each quadrant.

12. Apparatus according to claim 9, wherein said array comprises each of said outer cells being separated from each other of said outer cells by a mask, and each of said outer cells is separated from said center cell by said mask.

13. Apparatus for simultaneous angular tracking and signature sensing of an object, comprising:

source means, for producing a source beam which is impinged on the object, said source beam is reflected off of the object in the form a return beam;
reference means, for proving a reference beam;
combine means, for combining said return beam and said reference beam to produce a combined beam;
sensor means, having a center photodetector cell, said center cell being substantially covered by said combined beam, said center cell comprising means for converting photon energy from said combined beam into an electrical signature signal indicative of an optical signature contained in said return beam;
tracking means, having a plurality of outer photodetector cells surrounding said center cell forming an array, said outer cells having a portion thereof being impinged upon by said combined beam, said outer cells comprising means for converting photon energy from said combined beam into one or more electrical tracking signals indicative of a positional shift of said combined beam on said array; and
direct means, responsive to said electrical tracking signals, for maintaining a predetermined directional relationship between said source means and the object.

14. Apparatus according to claim 13, further comprising an optical means, for directing said combined beam onto said array.

15. Apparatus according to claim 13, wherein said outer photodetector cells comprise four identical photodetector cells, each of said outer photodetector cells being adjacent to two other of said outer photodetector cells, one of said outer cells disposed in each quadrant.

16. Apparatus according to claim 13, wherein said array comprises each of said outer cells being separated from each other of said outer cells by a mask, and each of said outer cells is separated from said center cell by said mask.

17. A heterodyne photodetector array, whereupon a spot from a return beam, reflected from an object, is impinged, comprising:

sensor means, having a center photodetector cell, said center cell being substantially covered by the spot, said center cell comprising means for converting photon energy from the return beam into an electrical signature signal indicative of an optical signature contained in said return beam; and tracking means, having a plurality of outer photodetector cells surrounding said center cell forming an array, said outer cells having a portion thereof being impinged upon by the spot, said outer cells comprising means for converting photon energy from the return beam into one or more electrical tracking signals indicative of a positional shift of the spot.

18. A heterodyne photodetector array according to claim 17, wherein said tracking means comprises said other cells having four identical photodetector cells, each of said outer photodetector cells being adjacent to two other of said outer photodetector cells, one cell in each quadrant.

19. A heterodyne photodetector array according to claim 17, wherein said array comprises each of said outer cells being separated from each other of said outer cells by a mask, and each of said outer cells is separated from said center cell by said mask.

* * * * *